(12) United States Patent
Neubauer et al.

(10) Patent No.: US 7,708,274 B2
(45) Date of Patent: *May 4, 2010

(54) CARD-HOLDING DEVICE IN A CARD-PROCESSING APPARATUS

(75) Inventors: Lutz Neubauer, Wunnenberg-Leiberg (DE); Thorsten Kulik, Salzkotten (DE); Martin Landwehr, Paderborn (DE)

(73) Assignee: Wincor Nixdorf International GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/136,124

(22) Filed: Jun. 10, 2008

(65) Prior Publication Data

US 2008/0240899 A1    Oct. 2, 2008

Related U.S. Application Data

(63) Continuation of application No. 10/533,633, filed on May 2, 2005, now Pat. No. 7,451,983.

(30) Foreign Application Priority Data

Nov. 27, 2002   (DE)   ................... 102 55 257
Jan. 21, 2003   (DE)   ................... 103 02 406
Nov. 3, 2003    (WO)   ............ PCT/DE03/03642

(51) Int. Cl.
*B65H 5/12* (2006.01)
*G06K 7/00* (2006.01)

(52) U.S. Cl. ............ 271/266; 271/265.01; 271/265.02; 235/486

(58) Field of Classification Search ................. 235/486, 235/483, 482; 271/265.01, 265.02, 266
See application file for complete search history.

(56) References Cited

U.S. PATENT DOCUMENTS

| | | | | |
|---|---|---|---|---|
| 4,480,181 A | * | 10/1984 | Fisher | 235/486 |
| 6,464,143 B2 | * | 10/2002 | Oki et al. | 235/475 |
| 6,491,216 B1 | * | 12/2002 | May | 235/375 |
| 6,802,742 B2 | * | 10/2004 | Chaillie | 439/630 |
| 2004/0018765 A1 | * | 1/2004 | Chaillie | 439/325 |
| 2006/0104797 A1 | * | 5/2006 | Neubauer et al. | 414/751.1 |

FOREIGN PATENT DOCUMENTS

| | | |
|---|---|---|
| CN | 200380104360.6 | 1/2006 |
| DE | 157944 A | 12/1982 |
| DE | 19535787 A1 | 3/1996 |
| DE | 10302406 B4 | 9/2004 |
| EP | 0745949 A2 | 12/1996 |
| EP | 1565869 B1 | 4/2008 |
| GB | 2293476 A | 3/1996 |
| JP | 2001222686 | 8/2001 |
| WO | 2004049236 A1 | 6/2004 |

* cited by examiner

*Primary Examiner*—Kaitlin S Joerger
(74) *Attorney, Agent, or Firm*—Michaud-Kinney Group LLP

(57) ABSTRACT

In a card processing apparatus a card tray and, a card-transporting device are provided. A device for sensing the position or detention of a card in the card tray and a holding device for a card that has stopped in an irregular manner in the card tray due to manipulation of the card-processing apparatus, are also included. The holding device is activated if a change in the position of the card is not detected even though a conveying signal has been issued to the card-conveying device.

9 Claims, 2 Drawing Sheets

CARD-HOLDING DEVICE IN A CARD-PROCESSING APPARATUS

CROSS-REFERENCE TO RELATED APPLICATIONS

This application is a continuation application and claims the benefit of U.S. patent application Ser. No. 10/533,633 filed on May 2, 2005, which is entitled to the benefit of International Application No. PCT/DE2003/003642 filed Nov. 3, 2003, and German Patent Application No. 10255257.6 filed Nov. 27, 2002, and German Patent Application No. 10302406.9 filed Jan. 21, 2003, the contents of all of the foregoing applications being incorporated by reference herein in their entireties.

FIELD OF THE INVENTION

The invention relates to a card-holding device in a card-processing apparatus.

BACKGROUND OF THE INVENTION

There have come to light attempts to manipulate card-processing apparatuses of automated teller machines in which a credit card is caught by means of a catching device placed in front of the card slot of the card-processing apparatus, so that it can neither be drawn in nor conveyed back to the card slot by the conveying device of the card-processing apparatus. At a later point in time, the catching device together with the caught credit card is removed from the card-processing apparatus, whereby the credit card gets into the hands of unauthorized individuals.

Methods and devices have been proposed which comprise a technique for destroying stored information if a card is deliberately pulled out of a magnetic card reader. In the case of the proposed method, unusual stopping of a magnetic card and movement of the card after stopping are sensed and a magnetic information-destroying device is activated in dependence on the movement.

Such a method is suitable only for magnetic cards; this method cannot be used at least for erasing chip cards with contacts, since their contacts cannot come into connection with those of the card-processing apparatus if the chip card is stopped prematurely. Furthermore, after erasure, the rightful owner of the card must be issued with a new card, which leads to time delays and additional costs.

The object of the invention is therefore to propose a card-processing apparatus with a device for protecting credit cards from misuse which is suitable for all types of card.

SUMMARY OF THE INVENTION

The present invention resides in one aspect in a card processing apparatus that includes a card tray and a card transporting device for sensing the position or detention of a card in the card tray. A holding device is provided for a card. The card holding device is activated if a change in the position of the card is not detected even though a conveying signal has been issued to the card-conveying device.

The invention is based on the idea that a credit card which can be caught by means of a catching device unlawfully attached to the card-processing apparatus cannot be pulled out of the card tray if a pull-out preventer is provided. According to the invention, this is realized by a holding device which immovably secures the card even if it is attempted with great force to pull the catching device together with the card out of the card tray. However, the ability of the card to move during regular operation of the card-processing apparatus must not be hindered. A card that has stopped in an irregular manner in the card tray due to manipulation of the card-processing apparatus is detected by a change in the position of the card not being detected even though a conveying signal has been issued to the card-conveying device. In this case, the holding device is activated.

In an embodiment of the invention, the holding device has at least one gripper, which is brought into contact with one of the sides of the card when the holding device is activated. The gripper presses the card against a counter-bearing and is provided with a great holding force with respect to the card in relation to a pulling-out force. The counter-bearing may comprise a delimiting surface of the card tray or some other fixed surface located in the latter. An advantage of this embodiment is that a simple drive for the gripper can be employed.

In another embodiment of the invention, the counter-bearing is a counter-gripper located opposite the gripper and acting on a second side of the card. This embodiment has the advantage that the card is held in the middle of the card tray and is consequently not subjected to any bending forces.

The gripper and/or the counter-gripper has in the region that comes into contact with the surface of the card a high friction coefficient with respect to the card.

According to a preferred embodiment of the present invention, the gripper and/or the counter-gripper is provided in the region that comes into contact with the surface of the card with at least one tooth-like point, which is able to dig into the surface of the card. This leads to particularly reliable retention of the card, without however destroying it or making it unusable.

The gripper and/or the counter-gripper may be formed as an eccentric which is attached in a rotationally fixed manner to a shaft, which can be rotated about its axis by an electro-mechanical drive, and is adjustable by said shaft between a position releasing the card tray and a holding position, the shaft lying ahead of the region where the eccentric is in contact with the card.

The gripper and/or the counter-gripper is preferably formed as an arcuate arm, one end of which is attached in a rotationally fixed manner to a shaft which can be made to rotate about its axis by an electrical drive and the other, free end of which is provided with the region having the high friction coefficient or with the at least one tooth-like point, the shaft lying ahead of the contact region of the gripper and/or the counter-gripper, as seen in the drawing-in direction of the card-processing apparatus.

In another embodiment, the gripper and/or the counter-gripper is formed in the manner of a lever, and can be placed at such an angle against the surface(s) of the card that the holding force exerted on the card increases as the expended pulling-out force increases.

In another preferred embodiment of the invention, a plurality of grippers and/or counter-grippers are distributed over the width of the card tray. In this case, all the grippers and/or counter-grippers can be brought jointly into the card tray, but the depth of penetration of the individual grippers and/or counter-grippers into the card tray is independent of the other grippers and/or counter-grippers.

In still another embodiment of the present invention, the card may be secured in the card-processing apparatus by means of a bolt which penetrates the card if manipulation is attempted. The bolt is preferably fastened to a lever which is mounted transverse to the card-conveying direction and is adjustable, for example, by means of an eccentric under the power of a motor, between a first position, in which the bolt clears the card-conveying path, and a second position, in which the bolt penetrates the card and prevents conveyance of the card.

BRIEF DESCRIPTION OF THE DRAWING

An exemplary embodiment of the invention is explained below on the basis of the accompanying drawings, in which.

DETAILED DESCRIPTION OF THE PREFERRED EMBODIMENTS

Figure 1:
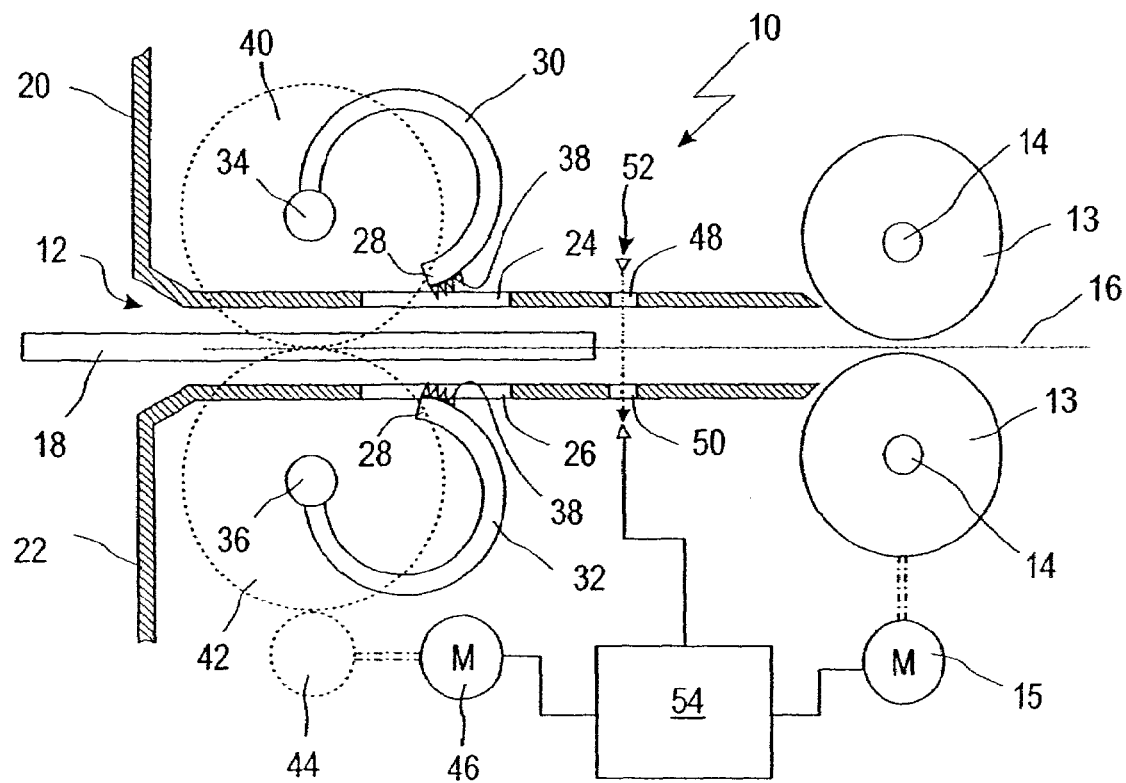
FIG. 1 shows a sectioned side view of the drawing-in region of a card-processing apparatus.
Figure 2:
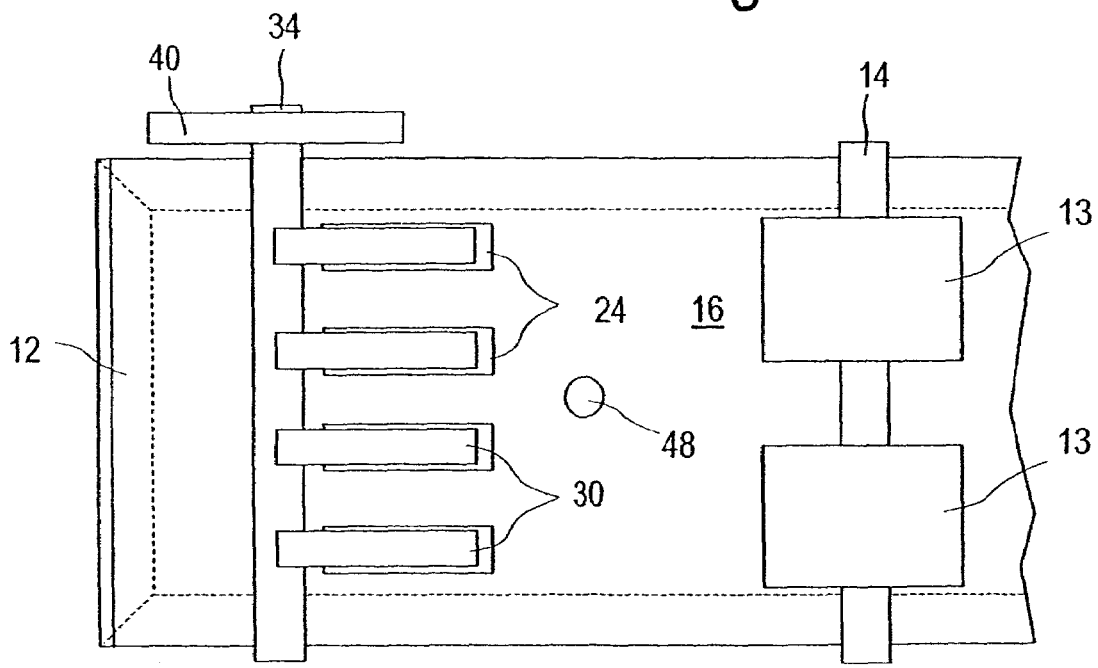
FIG. 2 shows the drawing-in region of the card-processing apparatus from FIG. 1 in a plan view.

In FIGS. 1 and 2, the drawing-in region of a card-processing apparatus 10 is represented in a sectioned side view and in plan view. Only a flared card-insertion opening 12 and a first pair of conveying rollers 13, the upper and lower rollers of which can be made to rotate with the aid of their conveying shafts 14, are represented. The conveying shafts 14 and all the further card-conveying means (not represented) of the card-processing apparatus 10 are drive-connected to a card-conveying motor 15. The conveying shafts 14 lie perpendicular to the drawing-in direction E of the card-processing apparatus 10 and parallel to a card tray 16, which in FIG. 1 is indicated merely by its center line. A credit card 18 has been partially inserted into the card tray 16.

The flared card-insertion opening 12 comprises an upper delimiting part 20 and a lower delimiting part 22. A series of clearances 24 have been made in the upper delimiting part 20 and a series of clearances 26 have been made in the lower delimiting part 22. The clearances 24, 26 are opposite one another. The free end 28 of an arcuate gripper 30, 32 protrudes into each of the clearances 24, 26 to the extent that the card tray 16 still remains free. The arms 30, 32 consist of an elastic material, for example spring steel, with a progressive elasticity curve. The upper arms 30 are connected to an upper shaft 34 and the lower arms 32 are connected to a lower shaft 36. The free end 28 of each arm 30, 32 is provided with a number of tooth-like points 38. Instead of or in addition to being provided with the points, the free end 28 of the arms 30, 32 may be provided with a material which has a high friction coefficient with respect to the material of the credit card 18.

The upper shaft 34 is rotationally connected to an upper gear wheel 40, which lies outside the card tray 16 and meshes with a lower gear wheel 42 mounted in a rotationally fixed manner on the lower shaft 36. Engaging in this lower gear wheel is a pinion 44, which can be driven by a servo-motor 46. Instead of the gear-wheel servo-drive 40, 42, 44, 46, a lever servo-drive which can be actuated by an electromagnet may also be used.

In the region between the clearances 24 and 26, respectively, and the pair of drive rollers 13, an upper bore 48 has been made in the upper delimiting part 20 and a lower bore 50 has been made in the lower delimiting part 22. The bores 48, 50 are opposite one another and are passed through by the beam of a device for detecting the position of the credit card 52.

Figure 3:
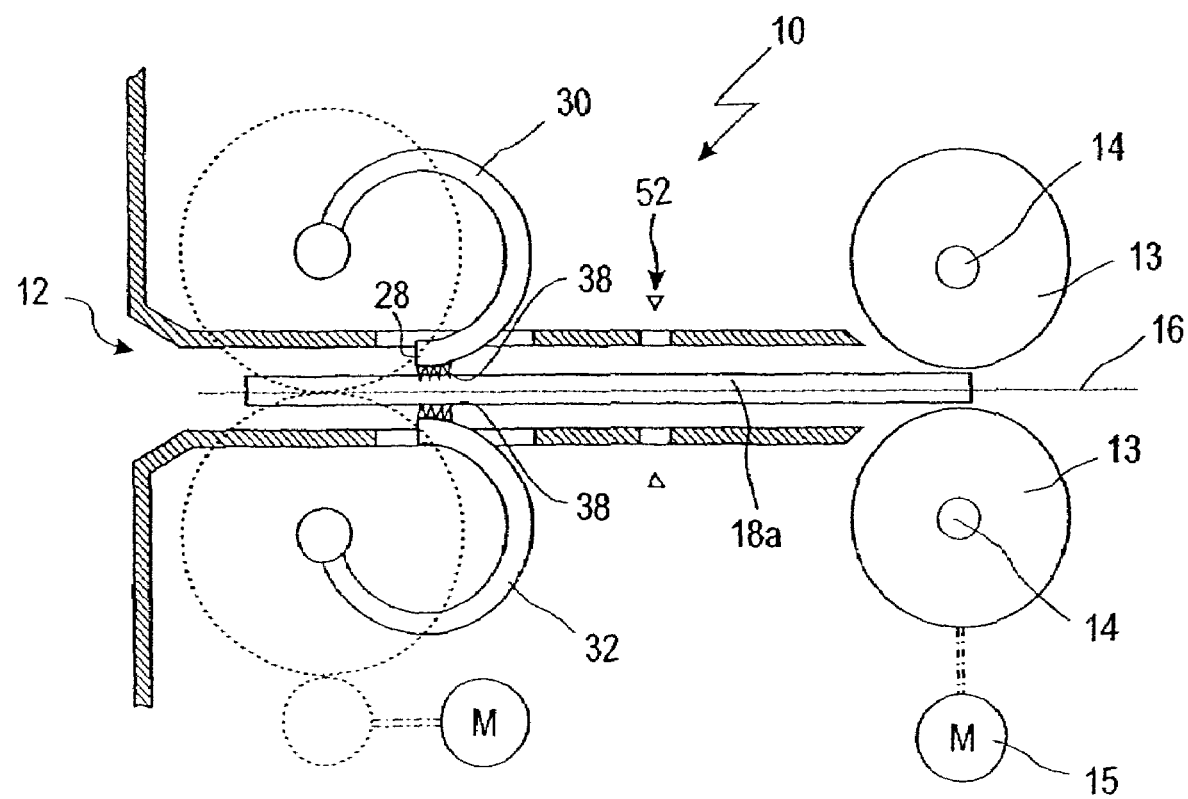
FIG. 3 shows the drawing-in region of the card-processing apparatus from FIG. 1 with a credit card secured in it.

FIG. 3 shows the drawing-in region of the card-processing apparatus 10 with a credit card 18a improperly secured in the card-processing apparatus 10 by a catching device (not represented). It can be seen that the arms 30, 32 have been adjusted into their holding position and the tooth-like points 38 are acting on the credit card 18a.

There now follows a description of the operating principle of the card-processing apparatus 10 and the card-holding device arranged in it. In the readiness position of the card-processing apparatus 10, the arms 30, 32 are in their position releasing the card tray 16, as is represented in FIG. 1. The beam of the light barrier 52 can pass through the two bores 48, 50 unhindered. If a credit card 18 is then pushed into the card tray 16 in the pushing-in direction E, the beam of the light barrier 52 is interrupted and its signal is transmitted to a control device 54. This then switches on the card-conveying motor 15, and a little later the credit card 18 is taken up by the conveying rollers 13. The interruption of the beam of the light barrier 52 starts in the control device 54 a monitoring time within which the light barrier 52 must be cleared. This is the case if the card is conveyed properly. If, however, the credit card 18 is secured in the card tray 16, the monitoring time expires without the light barrier 52 being cleared. The control device 54 then supplies current to the servo-motor 46, whereupon the arms 30, 32 are adjusted into their holding position, represented in FIG. 3.

On account of the progressive modulus of elasticity of the arms 30, 32, they are capable of adapting themselves thereby on a first part of their adjusting path to different card thicknesses and also to a catching device additionally introduced into the card tray 16. On the second part of the adjusting path, the elasticity of the arms 30, 32 decreases to the extent that they become virtually rigid in relation to a possible pulling-out force. If it is then attempted to pull the credit card 18a out of the card-processing apparatus 10 by force, the points 38 dig into the respective surface of the card and the arms 30, 32 are pivoted further toward each other. As a result, the distance between the free ends 28 of the upper and lower arms 30, 32 becomes even smaller and the retaining force of the holding device becomes even greater, so that it becomes virtually impossible to pull the credit card 18a out of the card-processing apparatus 10. The credit card 18a thereby remains undamaged, apart from the impressions of the points 38, which do not impair the function of the card. The return of the arms 30, 32 into their release position can only be performed by authorized personnel.

What is claimed is:

1. A card-processing apparatus comprising:
    a card tray;
    a card-conveying device;
    a device for sensing the position or detention of a card in the card tray;
    a holding device for a card that has stopped in an irregular manner in the card tray due to manipulation of the card-processing apparatus; and
    wherein the holding device is activated if a change in the position of the card is not detected even though a conveying signal has been issued to the card-conveying device;
    wherein the holding device has at least one gripper removable between a gripping and non-gripping position, when in the gripping position, the gripper is brought into contact with one of the sides of the card when the holding device is activated, and wherein the gripper presses the card against a counter-bearing and is provided with a great holding force with respect to the card in relation to a pulling-out force,
    the gripper having a region that comes into contact with the surface of the card with at least one tooth-like point, which is able to dig into the surface of the card, at least when a pulling-out force is applied.

2. The card-processing apparatus as claimed in claim 1, wherein the counter-bearing is a counter-gripper located opposite the gripper and acting on an opposing side of the card.

3. The card-processing apparatus as claimed in claim 1, the gripper of which has in a region that comes into contact with the surface of the card a high friction coefficient with respect to the card.

4. The card-processing apparatus as claimed in claim 1, wherein at least one of the gripper and the counter-bearing is formed as an eccentric attached in a rotationally fixed manner to a shaft which can be rotated about its axis by an electromechanical drive, and is adjustable by said shaft between a position releasing the card tray and a holding position, the shaft lying ahead of a region where the eccentric is in contact with the card relative to the drawing-in direction of the card-processing apparatus.

5. A card-processing apparatus comprising:
a card tray;
a card-conveying device;
a device for sensing the position or detention of a card in the card tray;
a holding device for a card that has stopped in an irregular manner in the card tray due to manipulation of the card-processing apparatus; and
wherein the holding device is activated if a change in the position of the card is not detected even though a conveying signal has been issued to the card-conveying device;
wherein the holding device has at least one gripper removable between a gripping and non-gripping position, when in the gripping position, the gripper is brought into contact with one of the sides of the card when the holding device is activated, and wherein the gripper presses the card against a counter-bearing and is provided with a great holding force with respect to the card in relation to a pulling-out force;
wherein at least one of the gripper and the counter-bearing is formed as an eccentric attached in a rotationally fixed manner to a shaft which can be rotated about its axis by an electromechanical drive, and is adjustable by said shaft between a position releasing the card tray and a holding position, the shaft lying ahead of a region where the eccentric is in contact with the card relative to the drawing-in direction of the card-processing apparatus, the eccentric of which is an arcuately formed arm, one end of which is rotationally fixed to the shaft and the other, free end of which is provided with at least one of a region having a high friction coefficient, and at least one tooth-like point.

6. A card-processing apparatus comprising:
a card tray;
a card-conveying device;
a device for sensing the position or detention of a card in the card tray;
a holding device for a card that has stopped in an irregular manner in the card tray due to manipulation of the card-processing apparatus; and
wherein the holding device is activated if a change in the position of the card is not detected even though a conveying signal has been issued to the card-conveying device;
wherein the holding device has at least one gripper removable between a gripping and non-gripping position, when in the gripping position, the gripper is brought into contact with one of the sides of the card when the holding device is activated, and wherein the gripper presses the card against a counter-bearing and is provided with a great holding force with respect to the card in relation to a pulling-out force;
wherein at least one of the gripper and the counter-bearing is in the form of a lever, is adjustable between a position releasing the card tray and a holding position wherein at least one of the gripper and the counter-gripper is positionable at such an angle against at least one surface of the card that the holding force exerted on the card increases as the pulling-out force increases.

7. A card-processing apparatus comprising:
a card tray;
a card-conveying device;
a device for sensing the position or detention of a card in the card tray;
a holding device for a card that has stopped in an irregular manner in the card tray due to manipulation of the card-processing apparatus; and
wherein the holding device is activated if a change in the position of the card is not detected even though a conveying signal has been issued to the card-conveying device;
wherein the holding device has at least one gripper removable between a gripping and non-gripping position, when in the gripping position, the gripper is brought into contact with one of the sides of the card when the holding device is activated, and wherein the gripper presses the card against a counter-bearing and is provided with a great holding force with respect to the card in relation to a pulling-out force;
wherein said gripper includes at least one of a plurality of grippers and a plurality of counter-grippers distributed over a width defined by the card tray.

8. A card-processing apparatus comprising:
a card tray;
a card-conveying device;
a device for sensing the position or detention of a card in the card tray;
a holding device for a card that has stopped in an irregular manner in the card tray due to manipulation of the card-processing apparatus; and
wherein the holding device is activated if a change in the position of the card is not detected even though a conveying signal has been issued to the card-conveying device;
wherein the holding device has at least one gripper removable between a gripping and non-gripping position, when in the gripping position, the gripper is brought into contact with one of the sides of the card when the holding device is activated, and wherein the gripper presses the card against a counter-bearing and is provided with a great holding force with respect to the card in relation to a pulling-out force;
wherein the counter-bearing is a counter-gripper located opposite the gripper and acting on an opposing side of the card; and
wherein at least one of all the grippers and all the counter-grippers can be brought jointly into the card tray, the depth of penetration of at least one the individual grippers and counter-grippers into the card tray is independent of the other grippers or counter-grippers.

9. The card-processing apparatus as claimed in claim 5, wherein the grippers are formed from an elastic material and have a progressive modulus of elasticity.

* * * * *